(No Model.) 6 Sheets—Sheet 1.
G. M. BRILL.
CAR BRAKE.
No. 513,229. Patented Jan. 23, 1894.
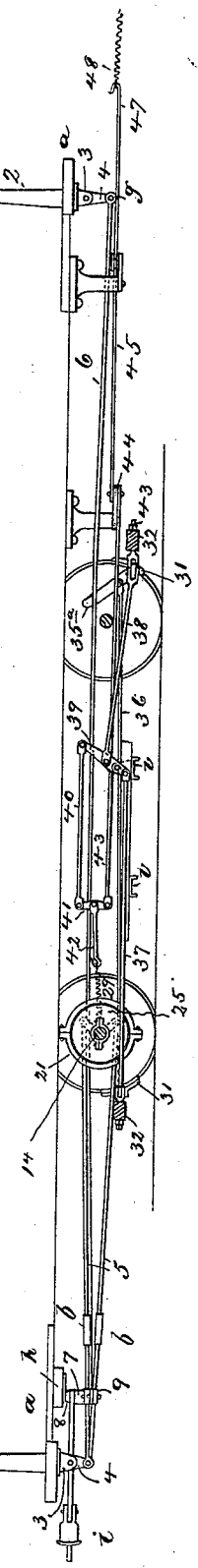
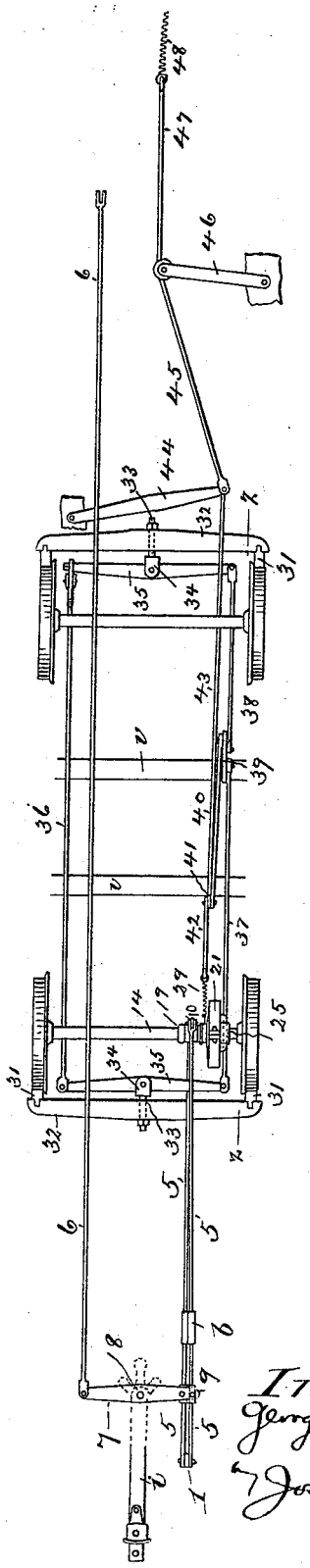
Attest:
C. W. Benjamin
H. F. Durbin
Inventor,
George Martin Brill
Joseph L. Levy
Atty

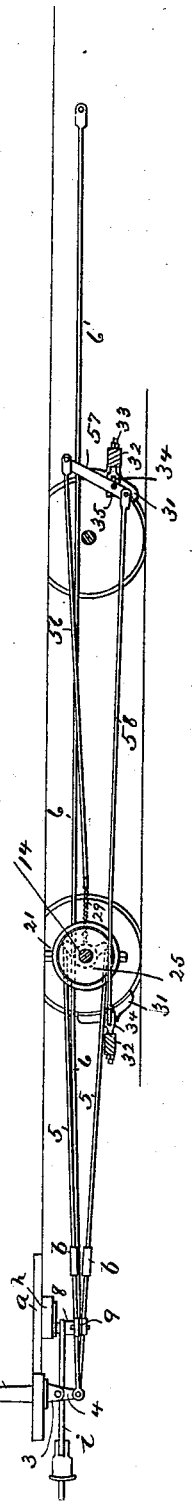

(No Model.)  
6 Sheets—Sheet 3.
G. M. BRILL.
CAR BRAKE.
No. 513,229.  
Patented Jan. 23, 1894.
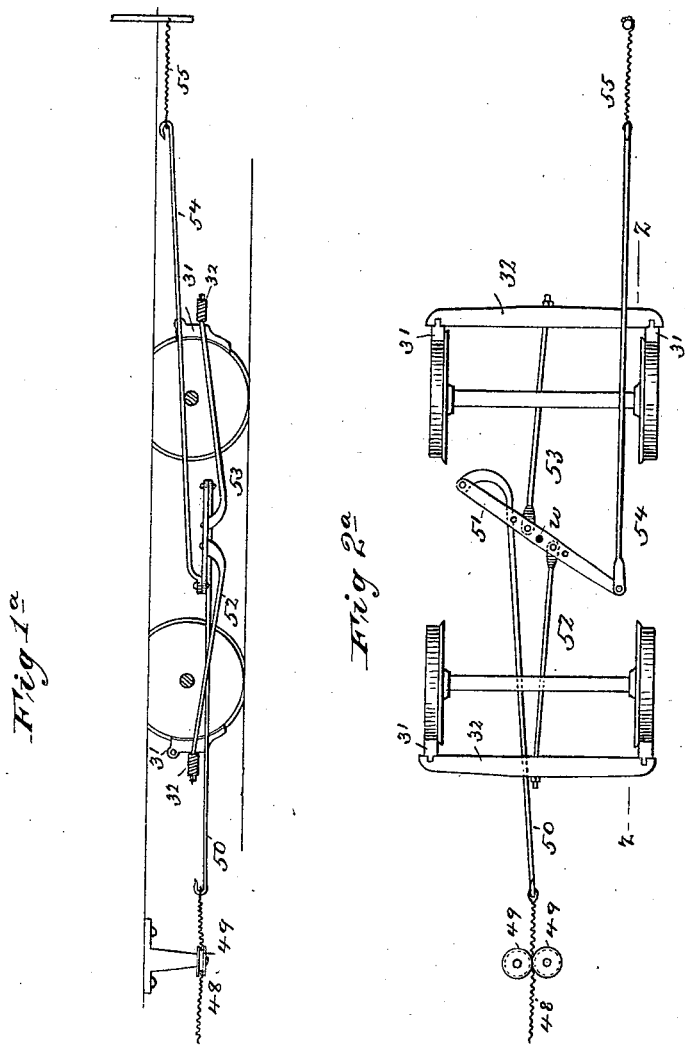
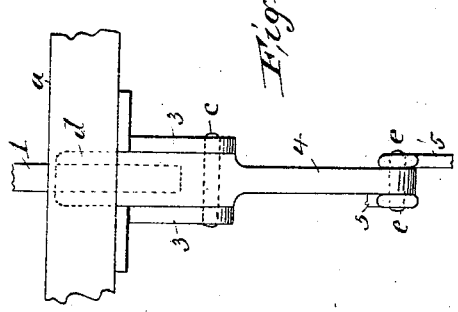
Attest:  
C. N. Benjamin  
H. F. Dunbar
Inventor,  
George Martin Brill  
by Joseph L. Levy  
atty.
THE NATIONAL LITHOGRAPHING COMPANY,
WASHINGTON, D. C.

(No Model.)

G. M. BRILL.
CAR BRAKE.

No. 513,229.

6 Sheets—Sheet 4.

Patented Jan. 23, 1894.

Attest:
C. W. Benjamin
H. F. Durkee

Inventor:
George Martin Brill
by Joseph L. Levy
Atty

THE NATIONAL LITHOGRAPHING COMPANY,
WASHINGTON, D. C.

(No Model.) 6 Sheets—Sheet 5.

G. M. BRILL.
CAR BRAKE.

No. 513,229. Patented Jan. 23, 1894.

Attest:
C. W. Benjamin
S. F. Dunbar

Inventor,
George Martin Brill
by Joseph L. Levy
Atty.

THE NATIONAL LITHOGRAPHING COMPANY,
WASHINGTON, D. C.

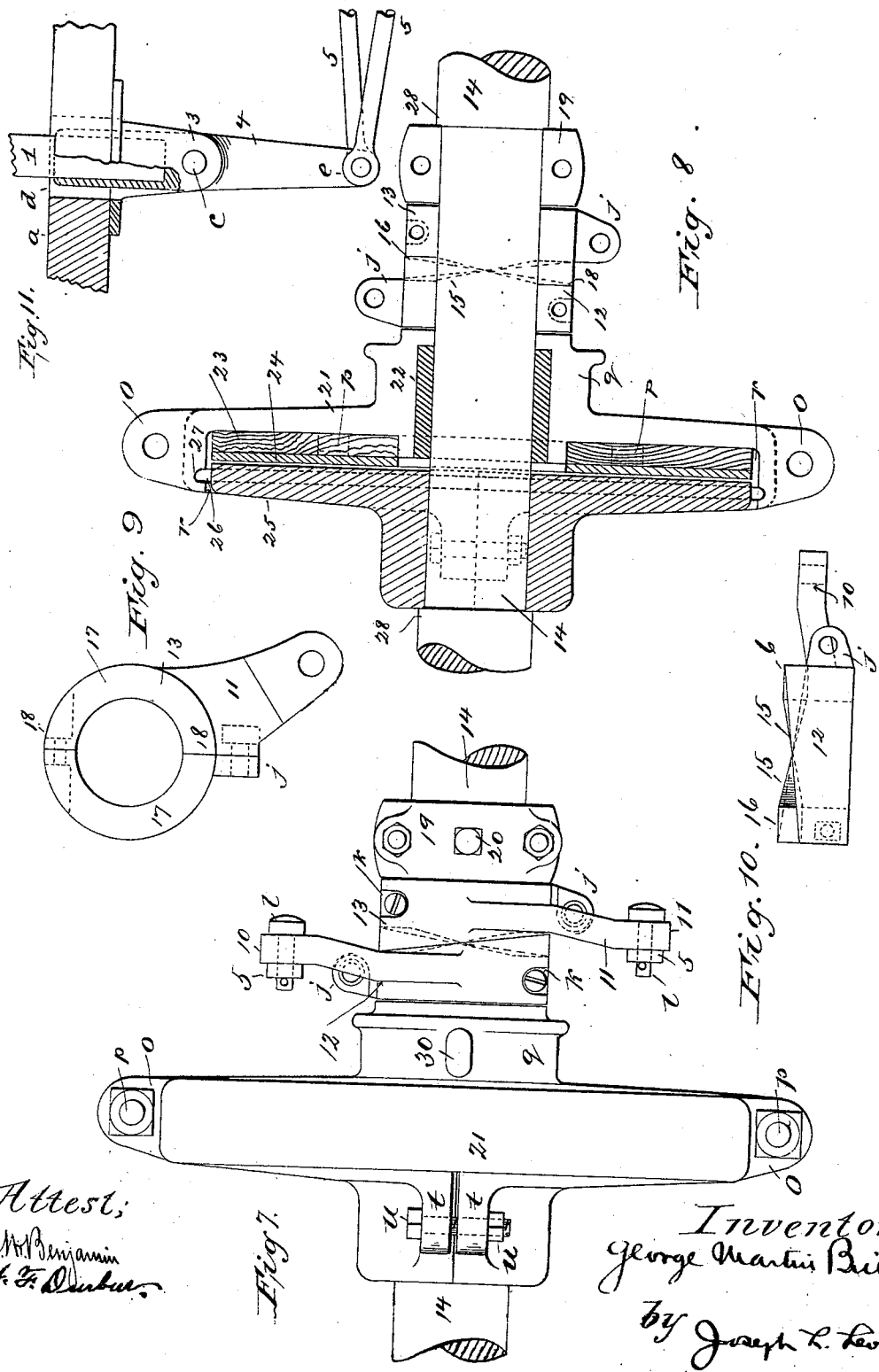

UNITED STATES PATENT OFFICE.

GEORGE MARTIN BRILL, OF PHILADELPHIA, PENNSYLVANIA.

CAR-BRAKE.

SPECIFICATION forming part of Letters Patent No. 513,229, dated January 23, 1894.

Application filed January 10, 1893. Serial No. 457,893. (No model.)

*To all whom it may concern:*

Be it known that I, GEORGE MARTIN BRILL, a citizen of the United States, residing at Philadelphia, in the county of Philadelphia and State of Pennsylvania, have invented new and useful Improvements in Car-Brakes, of which the following is a specification.

My invention relates to car brakes, and its object is to provide mechanism whereby the momentum of a moving car can be utilized for applying the brakes to the wheels of the car, and also to provide a brake system in which only one brakeman is needed to set the brakes of a plurality of cars, the arrangement of the parts being such that, upon the brakeman setting in operation the brake mechanism on one of the cars, preferably the leading or motor car, the momentum of that car will automatically apply the brakes to the wheels of the cars throughout the whole length of the train.

My invention more particularly resides in the novel construction, combination, and arrangement of parts hereinafter fully specified, and pointed out in the claims.

Figure 3:
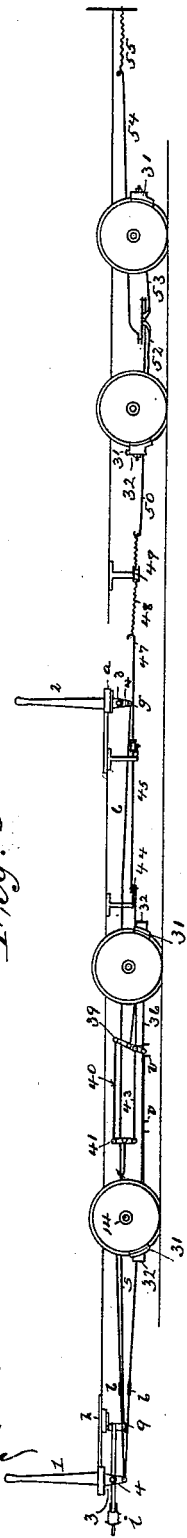
Figure 4:
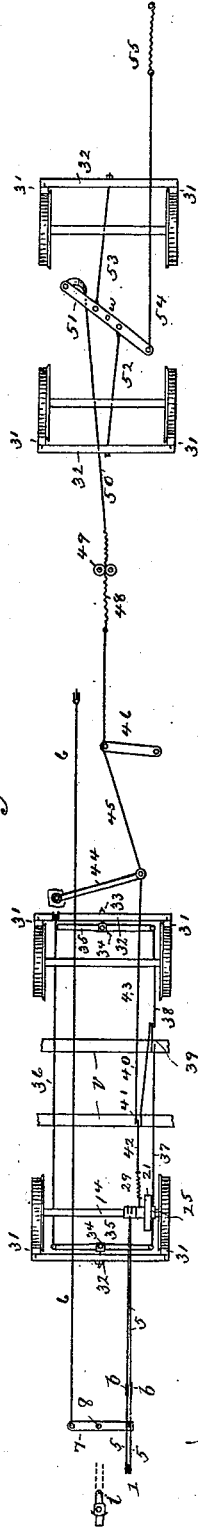
Figure 6:
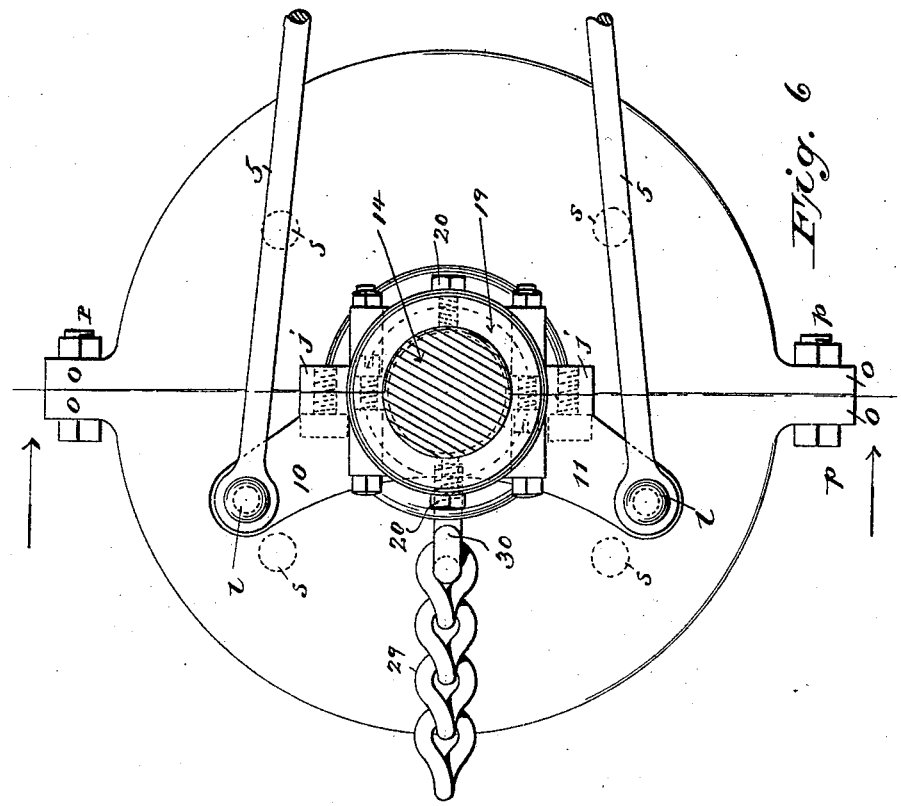
Figure 5:
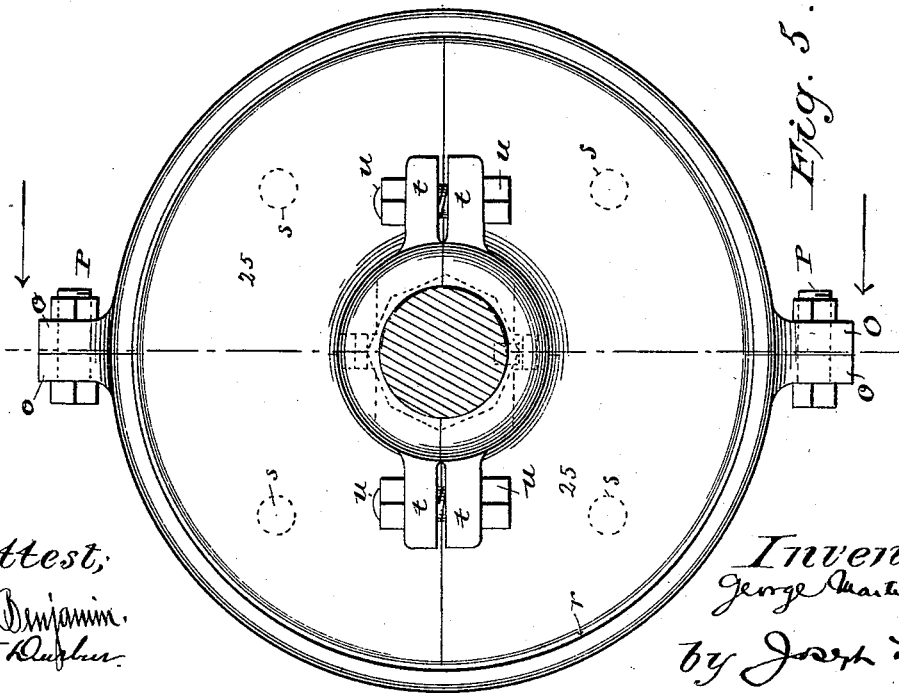

In the accompanying drawings, Figure 1 is a longitudinal vertical section, taken on the line $z\ z$ of Fig. 2, of a pair of car wheels and the brake mechanism connected therewith, the parts of the car not essential to the operation of the device being omitted for the sake of clearness. Fig. 2 is a top plan view of the same. These two figures illustrate the brake mechanism applied to a single car, such as a motor car, unconnected with others. Figs. $1^\times$ and $2^\times$ are similar views showing the brake mechanism applied in a modified way to the leading one of a train of cars, Fig. $1^\times$ being a section on the line $x\ x$ of Fig. $2^\times$. Figs. $1^a$ and $2^a$ are similar views of the brake mechanism of a trailing car, and its connections with the primary mechanism and with another trailing car, Fig. $1^a$ being a section on line 2 2, Fig. 2. Figs. 3 and 4 are an elevation and a plan view showing the brake mechanism of two cars; of which one is operated by the other. The remaining figures illustrate the friction clutch by means of which the brake mechanism is thrown into operation. Figs. 5 and 6 are outer and inner side elevations thereof. Fig. 7 is a front elevation. Fig. 8 is an end elevation, partly in section, looking in the direction of the arrows in Figs. 5 and 6. Figs. 9 and 10 are detail views of the cam faced collar. Figs. 11 and 12 are, respectively, side and front elevations, the means for detachably uniting the operating lever and brake rod connections, partly in section.

In the drawings 1, 2 are brake operating levers at the front and rear platforms of the car respectively, which levers may be detachably secured as clearly shown in Figs. 11 and 12. Said levers for convenience of detachment are preferably made in two parts, the lower part, or short arm, 4 of which is shown pivoted in hangers 3. The hangers 3 are secured under the platform $a$ of the car which is provided with an aperture $b$ about which the hangers depend. The short arm 4 is shown pivoted to and between the hangers by the pin $c$, and has at its upper end an enlargement, or socket, $d$ into which the end of the lever 1, or 2 can be inserted, and from which it can be removed should it be desired to use but one of the levers on either platform. The aperture $b$ is of sufficient size to permit the lever and the enlargement to have sufficient throw for the purpose hereinafter set forth.

To the front (or one) end of the car the short arms 4 are pivotally secured to rods 5 (for instance by the pin $e$), said rods preferably having turn buckles $f$ for lengthening or shortening them. At the rear (or opposite) end of the car a rod 6 is pivotally connected to the short arm 4 (for instance by the pin $g$) and said rod extends forwardly and is jointed to a primary equalizing lever 7, so called, pivotally carried at the front (or opposite) end of the car. The equalizing lever 7 is shown centrally pivoted at 8 to a cross beam $h$ on the car platform and if desired to the draw pin, which connects the draw head $i$ with the car. The lever 7 (on the side opposite its connection with rod 6) is shown pivotally connected to a sectional grip plate 9 in which are firmly secured the rods 5. It will be seen that by this arrangement an inward movement of either operating lever will shift the connecting rods 5 in the proper direction, that is, forwardly (should that end of the car be forward) and thus set the brakes, in the manner presently to be described.

The rods 5 diverge from the end of the arm 4 and are jointed (by pins 1) respectively to upwardly and downwardly extending arms 10, 11 carried by, and preferably made integral with cam faced collars 12, 13 on the axle 14. See Figs. 7, 8, 9, and 10. The collars 12, 13 are preferably made in halves and provided with lugs $j$ and recesses $k$, by which they are united. The collars 12, 13 are to move longitudinally of the axle 14 to operate a friction device for the purpose of setting brakes, and for this purpose the collar 12 has two segmental semi-spiral cam faces 15 terminating in the shoulder 16, and the collar 13 has similar faces 17 and shoulders 18 which normally rest in contact with the faces 15 and shoulders 16. The collars 12 and 13 are located upon the axle 14 between a collar 19 (made in halves, and having apertured bosses $m$ and bolts $n$ which unite the halves) secured to the axle by the set screw 20, and a drum 21 (made in halves, and having apertured lugs $o$ and bolts $p$ by which the halves are united) also carried by axle 14. Said drum 21 rotates on the axle 14, and preferably has secured thereto in its hub $q$, in a recess therein, a movable bearing 22, (capable of being replaced when worn out) and in an annular recess $r$, wood and leather or other friction disks 23, 24, kept in place by the lugs $s$, (shown in dotted lines) the disks being for frictional contact with a disk 25 which is rigidly fixed to the axle or said disk can be secured to the hub of the wheel or to the wheel proper. The chamber of the drum 21 is rendered dust proof by means of the groove 27 in the inner surface of the drum in which dust, &c., can collect. The disk 25 is made in halves, and has lugs $t$ and bolts $u$, by which the halves are united. The parts 12, 13, 19, 21, 22, 23, 24, 25, 26, are all made in halves, as shown, for convenience in fitting, and so that they can be readily replaced when worn out, and all the above parts are shown received between the two enlargements or shoulders 28 on the axle 14. It will now be seen that upon the brakeman operating either of the brake levers 1, 2, as above described, the arms 10, 11 are drawn forward, causing the inclined faces 15, 17 to move upon or slide past each other in opposite directions, and the collars 12, 13 to spread, forcing the friction surface of the drum 21 into contact with the disk 25, and making the drum 21 rotate with the axle, and thus wind round its hub a chain 29 which is fast to a hook 30 firmly secured in the hub, whereby the brake mechanism of one or several cars can be actuated.

The brake mechanism, except the new features herein shown, is similar to that set forth in the patent to me, No. 485,858, dated November 8, 1892; also as to upright brake lever that shown in the patent to Adams and Brill, No. 461,008, dated October 13, 1891, to which cross reference is made.

The brake shoes 31 are secured to the brake beam 32, and, in the mechanism shown in Figs. 1 and 2, the beams 32 carry centrally disposed bolts 33 terminating in pivot plates 34 which receive the equalizing levers 35 pivotally secured therein. The ends of these equalizers on the side of the car opposite to the friction clutch may be connected by a rod 36, or as shown in the drawings, an upright brake lever $35^a$ can be secured to the beam to the end of which lever $35^a$ the rod 36 can be secured. Rods 37, 38, jointed to the other ends of the equalizers, are pivotally connected to a lever 39, (above and below its fulcrum) the rod 37, which connects with the front cross piece, being shown secured at the end of the lever 39, and the rod 38 at or near the middle thereof. Bearings for the lever 39 are provided on the cross bars $v$ of the axle box frame or other part of the truck. To the other end of the lever 39 is jointed a rod 40 running to the end of a floating or equalizing lever 41, which is centrally pivoted to a rod 42 which connects with the chain 29. The other end of the lever 41 is connected by a rod 43 with the brake mechanisms on the succeeding cars, as will be presently described. It will now be seen that the winding of the chain 29 draws forward the rods 40 and 43 which movement of the rod 40, through the lever arm 39, and rods 37, 38, draws together the ends, and therefore also the centers, of the equalizers 35, which exert the same action upon the beams 32, pressing the brake shoes upon all the wheels of the car, with equal force on account of the transmission of the force through the centers of the beams 32, and rod 43 applies the brakes upon the succeeding car, the equalizing lever 41 allowing the brakes on both cars to be applied simultaneously. By this arrangement of floating equalizing lever 41 and connected parts, any movement of the car body or truck will not interfere with the proper action of said lever and connecting rods.

Power is applied to the trailing cars as follows: The rod 43 is secured at its rear end to a swinging arm 44, pivoted on the frame of the car, which arm 44 connects with a rod or connection 47 leading to another car, the arm 44 being shown connected by a rod 45 with the free end of a similar arm 46 on the same car, which is in like manner shown connected by rod 47 to a chain 48 passing between the sheaves 49 on the next car, and actuating the brake mechanism thereon. This mechanism is shown in Figs. $1^a$ and $2^a$, and consists of a rod 50 having a goose neck, secured to the chain 48, and pivotally secured to an equalizer 51 pivoted to car at $w$, to which are jointed, near the center, the rods 52, 53, connected with the centers of the brake beams. The other end of the equalizer 51 is shown pivotally connected with a rod 54 which is either connected with the succeeding car in the manner shown in Figs. 1 and 2, or, if the car be the last of the train, is secured by a chain 55 with the frame of the car. The arrangement of the rods 50, 52, 53, 54, is the same in principle as that shown in Figs. $1^x$ and $2^x$ and is such that a forward pull upon the rod 50, the rod 54 being retained in position, tends to draw the rods 52, 53, and therefore the brake beams, together.

The brake mechanism shown in Figs. $1^x$ and $2^x$ is intended for use in a single unconnected car. The floating lever 41 and rods 40, 43 and 38 are dispensed with; a single rod 56 leading from the friction devices is substituted for the rods 40, 42, and the upright lever 57 is connected directly with the end of the rear equalizer 35, and a single rod 58 leads from the front equalizer directly to the lower part of the lever 57.

Having thus fully described my invention, what I claim, and desire to secure by Letters Patent, is—

1. In a car brake mechanism, the combination of brake beams, brakes secured therein, equalizers secured centrally to said beams and directly connected together, an upright lever included in said connections and means connected with the car wheels for primarily operating the upright lever and drawing the ends of the equalizers each toward the opposite beam, substantially as described.

2. In a car brake mechanism, the combination of brake beams, brakes carried thereby, equalizers centrally pivoted to said beams, the ends of which equalizers are on one side inextensibly connected, connections for the other side of the equalizers, an upright lever included in said connections, and means connecting the car wheels and said lever to draw the equalizers toward each other to apply the brakes, substantially as described.

3. In a car brake mechanism, the combination of brake beams, brakes carried thereby, equalizers centrally pivoted to said beams, the corresponding ends of which equalizers are connected by a rod, rods jointed to the other ends of the equalizers, the opposite ends of the latter rods being jointed to a lever arm, a rod jointed to the lever arm and means connected with the car wheels for drawing the latter rod forward, thereby, through the lever arm, drawing together the free ends of the equalizers and setting the brakes, substantially as described.

4. In a car brake mechanism, the combination of brake beams, brakes secured therein, levers pivoted on the brake beams, a rod connecting corresponding ends of said levers for drawing the latter together when the rod is moved forward, an operative connection between the other end of the levers and the wheels for transmitting motion therefrom to the levers, and a rod to be connected with the last named mechanism and with the brake mechanism on succeeding cars, substantially as described.

5. In a car brake mechanism, the combination of brakes, equalizing levers 35 to which said brakes are connected, an inextensible rod connecting the ends of said levers on one side, and an extensible connection between the ends on the other side, and means for contracting the latter connection, substantially as described.

6. In a car brake mechanism, the combination of brakes, equalizing levers 35 to which said brakes are connected, an inextensible rod connecting the corresponding ends of the equalizing levers on one side, a lever on the other side pivoted to the car frame, and rods jointed to said lever above and below its fulcrum, and to the opposite corresponding ends of the said equalizing levers for operating said lever, substantially as described.

7. In a car brake mechanism, the combination of brakes, brake beams therefor, equalizing levers to which said beams are centrally pivoted, an inextensible rod connecting the corresponding ends of the equalizing levers on one side, a lever on the other side pivoted to the frame of the car, and rods joined to said lever on opposite sides of its fulcrum, and to the other ends of the equalizing levers, and means for operating said lever, substantially as described.

8. In a car brake mechanism, the combination of brakes, equalizing levers 35 to which said brakes are connected, an inextensible rod connecting the ends of the levers on one side, a lever on the other side, pivoted to the frame of the car, and rods joined to said lever on opposite sides of its fulcrum and to the other ends of the equalizing levers, connections for operating the lever from the wheels of the car, and means for completing the operative connections with the wheels when desired, substantially as described.

9. The combination of brakes, brake beams, a lever pivoted to the truck frame, rods joining said beams to points on the lever on either side of its fulcrum and connections between said lever and the brake mechanism on an adjoining car, substantially as described.

10. In a car brake the combination of an axle, a disk secured thereto, a drum loose upon the axle having friction surfaces adjacent to the disk, brake beams and brakes, levers pivotally connected with said beams, and mechanism connected to said levers and to said drum, and means for forcing said friction surfaces against said disk, substantially as described.

11. In a car brake the combination of an axle, a disk secured thereon, a drum loose upon the axle having friction surfaces adjacent to the disk, cam faced collars upon the axle and a shoulder or similar means upon the axle for restraining the outer collar, a lever and connections between said lever and both of said cam faced collars, for moving the collars in opposite directions, whereby said friction surfaces are forced against said disk, substantially as described.

12. In a car brake, the combination of an axle, a disk secured thereon, a drum loose on the axle having friction surfaces adjacent to the disk, semi-spiral cam faces having shoulders engaging with each other in the position of rest, a shoulder or similar means upon the axle for restraining the outer collar, and means for moving the collars in opposite directions, whereby said friction surfaces are forced against said disks, substantially as described.

13. In a car brake, the combination of an axle, a disk secured thereon, a drum loose upon the axle having friction surfaces adjacent to the disk, cam-faced collars upon the axle, and a shoulder or similar means upon the axle for restraining the outer collar, the collars having oppositely extending projections, a hand lever, and links connecting said lever with said projections, substantially as described.

14. In brake mechanism, in combination, a car-axle and friction drum mounted thereon, and means substantially as described for operating the drum, and a chain connecting the drum with a longitudinally moving bar, such bar bearing an equalizing lever, the two ends of the lever being operatively connected with the lever system of different cars, whereby the brakes of the different cars are simultaneously operated, substantially as described.

15. In a car brake system, the combination of brake mechanism, connections carried by the car axle for operating said mechanism from the wheels of the car, upright levers carried by the car at opposite ends thereof, and having movement fore and aft thereon, and inflexible longitudinally movable rods connecting said levers with said brake operating mechanism whereby the latter can be actuated from opposite ends of the car, substantially as described.

16. In a car brake system, a car or truck, a brake mechanism carried thereby, which includes brake beams, equalizing bars and connections between them for drawing the beam equalizers together, combined with a device for utilizing the momentum of the car for applying the brakes, an equalizing lever interposed between said connections and device, and connections with the opposite ends of the car and said device whereby said brake applying device can be operated from either end of the car, substantially as described.

17. In a car brake system, a car, a lever 7 located at one end of the car, a connection extending from said lever to the opposite end of the car and means for actuating said connection to operate the lever 7, combined with means adjacent to and connected with said lever for operating it, brake mechanism, means connected with the wheels for setting said mechanism, and connections between lever 7 and said brake setting mechanism, whereby the latter can be operated from either end of the car, substantially as described.

18. In a brake system, a brake mechanism and means for operating it from the axle of the car, combined with an upright lever included in said mechanism, an equalizing device connecting said means and lever, and connections extending from said equalizing device for connection with the brake mechanism of another car, substantially as described.

19. In a car brake system, a brake mechanism, means for operating it from the axle of the car, a lever 44 connected with said operating means and an arm 46 for connection with the brake mechanism of another car, substantially as described.

20. In a car brake system, a friction device connected with a car wheel and means for setting said device, combined with brake mechanism, a lever 39 included in said mechanism and arranged to operate portions of said device in opposite directions and connections between said lever and said friction device for operating the former by the latter, substantially as described.

21. In a car brake system, brake beams and connections between them for operating them conjointly, combined with an operative lever 39 included in said connections, an equalizing lever 41, a rod 40 connecting the latter with lever 39 and means for operating the lever 41 to set the brakes, substantially as described.

22. In a car brake system, brake beams, equalizing levers pivoted thereto and connections between said levers, combined with a lever 39 included in said connections, an equalizing lever 41, a rod 40 connecting levers 39 and 41, and connections between the car wheel and lever 41 for operating the brake mechanism, substantially as described.

23. In a car brake system, brake beams, and connections between them for operating them conjointly, combined with a lever 39 located in said connections, an equalizing lever 41, rod 40 connecting levers 39 and 41, a rod 43 extending from lever 41 for connection with the brake mechanism of another car, and means for operating the equalizing lever 41 to set the brakes, substantially as described.

24. In a car brake system, brake beams, and connections between them for operating them conjointly, and a lever 39 located in said connections, combined with an equalizing lever 41, rod 40 connecting said levers, a rod 42 extending from lever 41, a chain connected with rod 42 and a friction device connected with the car wheels and with said chain for operating the lever 39 and thereby the brakes, substantially as described.

Signed at Philadelphia, in the county of Philadelphia and State of Pennsylvania, this 6th day of January, 1893.

GEORGE MARTIN BRILL.

Witnesses:
R. S. REED,
R. W. BROADBENT.